United States Patent
Cheng

(10) Patent No.: US 9,701,354 B2
(45) Date of Patent: Jul. 11, 2017

(54) BICYCLE-MOUNTED HOLDER

(71) Applicant: Moon Sport Limited, Hong Kong (CN)

(72) Inventor: Wuipan Cheng, Hong Kong (CN)

(73) Assignee: Moon Sport Limited, Hong Kong (CN)

( * ) Notice: Subject to any disclaimer, the term of this patent is extended or adjusted under 35 U.S.C. 154(b) by 107 days.

(21) Appl. No.: 14/862,157

(22) Filed: Sep. 23, 2015

(65) Prior Publication Data
US 2016/0207581 A1 Jul. 21, 2016

(30) Foreign Application Priority Data
Jan. 19, 2015 (HK) .................................. 15100596

(51) Int. Cl.
*B62J 11/00* (2006.01)
*B62J 11/02* (2006.01)
*B62J 6/02* (2006.01)

(52) U.S. Cl.
CPC ................. *B62J 11/00* (2013.01); *B62J 6/02* (2013.01); *B62J 11/02* (2013.01)

(58) Field of Classification Search
CPC .................................. B62J 11/00; B62J 11/02
USPC ....... 224/420, 425, 431, 441, 443, 445, 447, 224/451, 454, 459
See application file for complete search history.

(56) References Cited

U.S. PATENT DOCUMENTS

| | | | | |
|---|---|---|---|---|
| 4,477,865 A * | 10/1984 | Tsuyama | .................... | B62J 6/00 248/230.7 |
| 5,332,183 A * | 7/1994 | Kagayama | ............... | B62J 11/00 224/420 |
| 5,464,135 A * | 11/1995 | Studdiford | ............... | B62H 5/00 224/420 |
| 5,735,441 A * | 4/1998 | Fujimoto | ................. | B62J 11/00 224/420 |
| 6,520,054 B1 * | 2/2003 | Wang | .................. | B25B 27/0071 224/425 |
| 7,077,302 B2 * | 7/2006 | Chuang | .................... | B62J 11/00 224/271 |
| 7,311,233 B2 * | 12/2007 | Chen | ........................ | B62J 11/00 224/425 |
| 8,087,558 B2 * | 1/2012 | Tsai | ........................ | B62H 5/00 224/425 |
| 8,132,700 B2 * | 3/2012 | Dacko | ..................... | B62J 11/00 224/420 |

(Continued)

*Primary Examiner* — Justin Larson
(74) *Attorney, Agent, or Firm* — Bei & Ocean; George G. Wang

(57) ABSTRACT

A bicycle-mounted holder including a pedestal, a supporting plate, two movable arms and a buckle, where the bottom of the pedestal is equipped with two pins which are parallel to each other; the supporting plate is fixed on the pedestal through a screw and is capable of swinging to different regulating angles as required; the two movable arms are located on the two pins respectively and are capable of rotating around the respective pins; the tail end of each of the two movable arms is provided with an arc surface which is curled outwards; each of the two movable arms is provided with an inward arc surface matching the bottom of the supporting plate and capable of being stretched outwards and contracted for clamping an article; and the buckle is simultaneously buckled on the arc surfaces of the two movable arms.

14 Claims, 6 Drawing Sheets

(56) References Cited

U.S. PATENT DOCUMENTS

| | | | |
|---|---|---|---|
| 8,348,296 B2* | 1/2013 | Taiga | B62J 11/00 224/420 |
| 8,387,939 B2* | 3/2013 | Ford | B62J 6/02 224/418 |
| 8,851,348 B2* | 10/2014 | Zuraski | B62H 5/00 224/425 |
| 2003/0106919 A1* | 6/2003 | Chuang | B62J 11/00 224/420 |
| 2005/0092798 A1* | 5/2005 | Borgman | B62J 11/00 224/420 |

* cited by examiner

BICYCLE-MOUNTED HOLDER

CROSS-REFERENCE TO RELATED APPLICATIONS

This application claims priority from HK Application No. 15100596.1, filed Jan. 19, 2015, the contents of which are incorporated herein in the entirety by reference.

FIELD OF THE INVENTION

The present invention relates to a holder, in particular to a bicycle-mounted holder.

BACKGROUND OF THE INVENTION

The bicycle, serving as a traffic tool for daily use, not only is environment-friendly, but also is capable of building up body, and is thus favored by the public. With development of science and technology, more and more electronic equipment or safety equipment, such as a nightlight may be assembled on the bicycle, and accordingly a bicycle-mounted holder is produced, however, the bicycle-mounted holder commercially available at present cannot be buckled on a seat, handles, a helmet, a front fork or a rear fork freely, and when the handles are different in shape or size, the bicycle-mounted holder also needs to be replaced again. It thus can be seen that a holder which may be buckled on the seat, the handles, the helmet, the front fork, the rear fork or the like freely is urgent to be developed for the purpose of meeting the mounting requirements of different users or different equipment.

SUMMARY OF THE INVENTION

The features and the advantages of the present invention will be partially stated in the description hereinafter set forth, or are apparent from the description, or are learn from the practice of the present invention.

In order to overcome of the problems of the existing technology, the present invention provides a bicycle-mounted holder which can be buckled on articles of different shapes and different sizes by employing movable arms capable of rotating around pins located on a pedestal in conjunction with a buckle configured to be simultaneously buckled on the two movable arms.

The following technical solutions are adopted by the present invention for the purpose of solving said technical problems:

According to one aspect of the present invention, a bicycle-mounted holder is provided, which comprises a pedestal, a supporting plate, two movable arms and a buckle, wherein the bottom of the pedestal is equipped with two pins which are parallel to each other; the supporting plate is fixed on the pedestal through a screw; the two movable arms are located on the two pins respectively and are capable of rotating around the respective pins; the tail end of each of the movable arms is provided with an arc surface which is curled outwards; each of the two movable arms is provided with an inward arc surface which is matched with the bottom of the supporting plate, and the inward arc surfaces are capable of being stretched outwards and contracted for clamping fit with non-cylindrical or olivary articles of different shapes and different sizes; and the buckle is configured to be simultaneously buckled on the arc surfaces of the two movable arms.

According to one embodiment of the present invention, the supporting plate is provided with two guide rail grooves which are parallel to each other.

According to one embodiment of the present invention, an opening of each guide rail groove is configured along the horizontal direction.

According to one embodiment of the present invention, the length of each of the two guide rail grooves is equal to the distance between the two guide rail grooves.

According to one embodiment of the present invention, the outside surface of one movable arm is equipped with a barrier sheet which is on the same level with the tail end of the arc surface of the corresponding movable arm and used for being matched with the arc surface so as to prevent the buckle from falling off.

According to one embodiment of the present invention, the distance between the barrier sheet and the tail end of the arc surface of the corresponding movable arm is less than the diameter of the buckle.

According to one embodiment of the present invention, the bicycle-mounted holder also comprises anti-skidding pads which are connected with the inward arc surfaces of the movable arms.

According to one embodiment of the present invention, each anti-skidding pad is provided with a raised ridge, each movable arm is provided with a fixing hole, and the anti-skidding pads are connected with the inner sides of the movable arms through inserting the ridges on the anti-skidding pads to the fixing holes.

According to one embodiment of the present invention, an arched component which is arched upwards is configured in the center of the upper surface of the pedestal; and the bottom of the supporting plate is provided with an arc surface which is matched with the arched component and configured to enable the supporting plate to swing to different regulating angles around the arched component.

According to one embodiment of the present invention, the arc surface of the bottom of the supporting plate is provided with multiple gear snaps which are configured to realize the purpose of adjusting the supporting plate in an up-down direction.

According to one embodiment of the present invention, the two ends of the arched component are respectively equipped with a barrier block which is integrally formed with the upper surface of the pedestal; and the bottom of the supporting plate is equipped with an arc-surface fringe, and the arc surface is located on the bottom of the arc-surface fringe.

According to one embodiment of the present invention, the bicycle-mounted holder also comprises a positioning shaft which is located below the arched component and is connected with the supporting plate through the screw.

According to one embodiment of the present invention, the bicycle-mounted holder also comprises a spring which is located on the supporting plate, and the screw penetrates through the spring, the supporting plate and the pedestal in sequence.

According to one embodiment of the present invention, the two movable arms can be configured to fix a bicycle lamp, so that the bicycle lamp can be used in a distance not more than 15 mm away from the stem.

Those common skilled in the art will well know the features and the contents of these technical solutions after reading the description.

BRIEF DESCRIPTION OF THE DRAWINGS

The present invention will be described in detail by reference to the attached drawings and in conjunction with the embodiments, and the advantages and the implementation modes of the present invention will be more apparent, wherein the contents as shown in the attached drawings are just for the purpose of illustrating the prevent invention, but not limiting the present invention in any meaning, in the attached drawings.

DETAILED DESCRIPTION OF PARTICULAR EMBODIMENTS OF THE INVENTION

Figure 1:
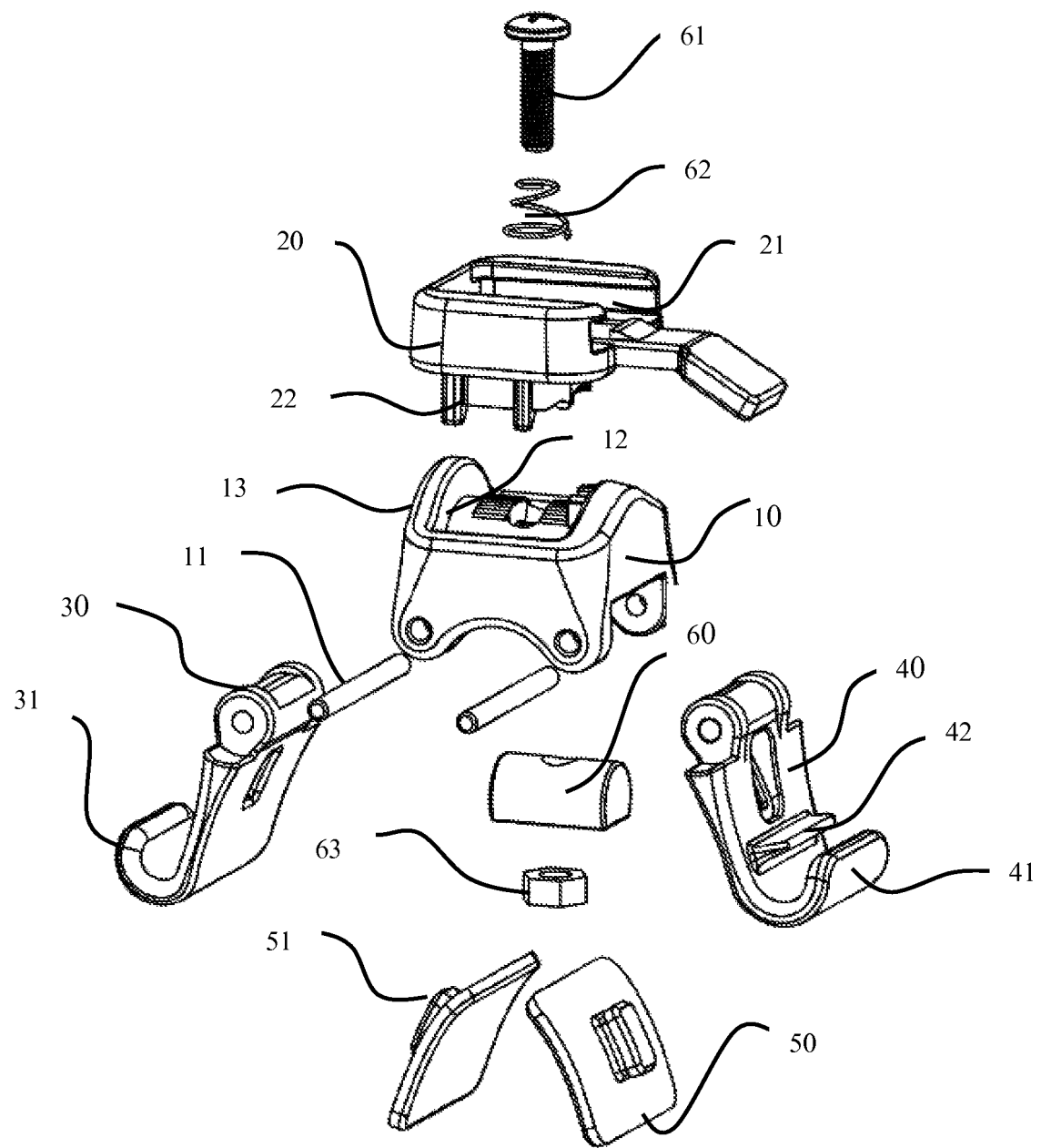
FIG. 1 is a structural schematic diagram of the bicycle-mounted holder of the present invention before assembly.
Figure 2:
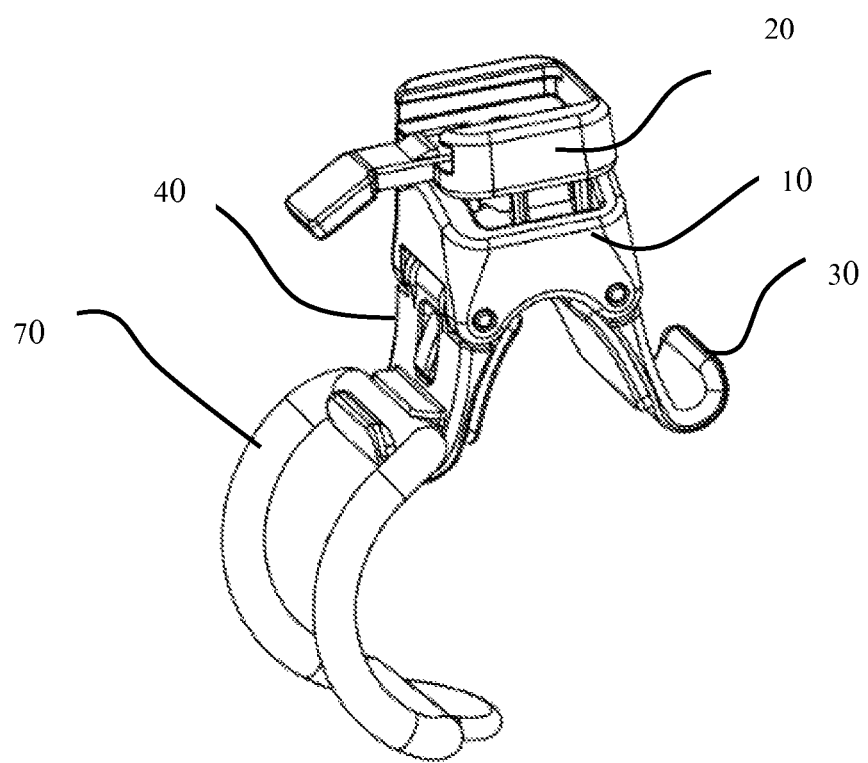
FIG. 2 is a structural schematic diagram of the bicycle-mounted holder of the present invention after assembly.

As shown in FIG. 1, the present invention provides a bicycle-mounted holder which comprises a pedestal 10, a supporting plate 20, two movable arms 30 and 40 and a buckle 70, wherein the bottom of the pedestal 10 is equipped with two pins 11 which are parallel to each other; the supporting plate 20 is fixed on the pedestal through a screw 61; the two movable arms 30 and 40 are located on the two pins 11 respectively and are capable of rotating around the respective pins; the tail ends of the movable arms are respectively provided with arc surfaces 31 and 41 which are curled outwards; the two movable arms are respectively provided with inward arc surfaces which are matched with the bottom of the supporting plate and are capable of being stretched outwards and contracted for the purpose of clamping fit with non-cylindrical or olivary articles of different shapes and different sizes; and the buckle 70 is configured to be simultaneously buckled on the arc surfaces of the two movable arms.

A barrier sheet 42 is configured on the outside surface of one movable arm 40 and is on the same level with the tail end of the arc surface of the corresponding movable arm, and the distance between the barrier sheet and the tail end of the arc surface of the corresponding movable arm is less than the diameter of the buckle, and the barrier sheet is matched with the arc surface 41 for the purpose of preventing the buckle 70 from falling off; of course, the baffle barrier can be also configured on both the movable arms respectively. In this embodiment, an O-shaped buckle is adopted, and the diameter of the buckle is 1 to 2 mm, for instance, larger than the distance between the barrier sheet 42 and the tail end of the arc surface 41 of the corresponding movable arm, so that the buckle is trapped inside a space defined by the barrier sheet 42 and the arc surface 41 of the corresponding movable arm more firmly, and thus the O-shaped buckle can be inserted and no natural dropping problem raises. The outer sides of the movable arms 30 and 40 refer to the reverse sides of the two movable arms 30 and 40, whereas the inner sides thereof refer to the opposite sides of the two movable arms 30 and 40.

In order to prevent the bicycle-mounted holder from falling off, the bicycle-mounted holder disclosed by the present invention also comprises anti-skidding pads 50 which are connected with the inward arc surfaces of the movable arms 30 and 40, wherein each anti-skidding pad 50 is provided with a raised ridge 51, each movable arm is provided with a fixing hole, and the anti-skidding pads are connected with the inner sides of the movable arms through inserting the ridges 51 on the anti-skidding pads to the fixing holes; and the anti-skidding pads may be soft pads for effectively preventing a bicycle from being scratched.

Figure 3A:
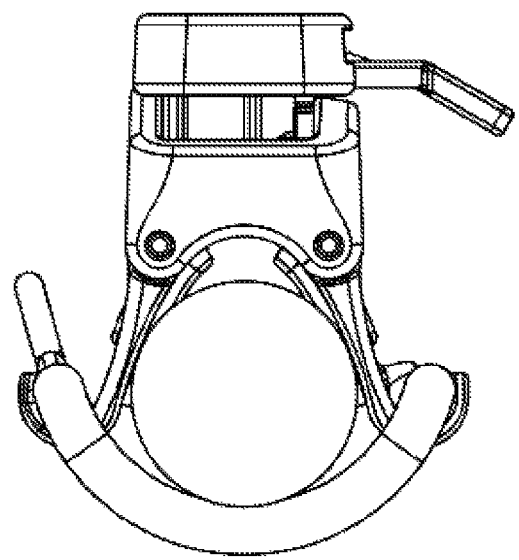
FIG. 3A is a schematic diagram that the bicycle-mounted holder of the present invention buckles a circular pole with a smaller diameter.
Figure 3B:
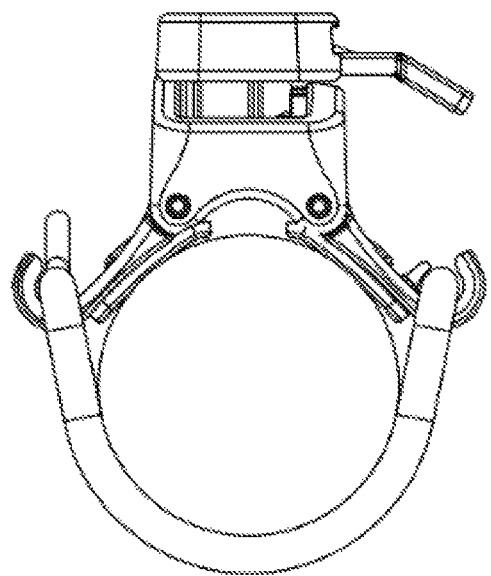
FIG. 3B is a schematic diagram that the bicycle-mounted holder of the present invention buckles a circular pole with a larger diameter.
Figure 4:
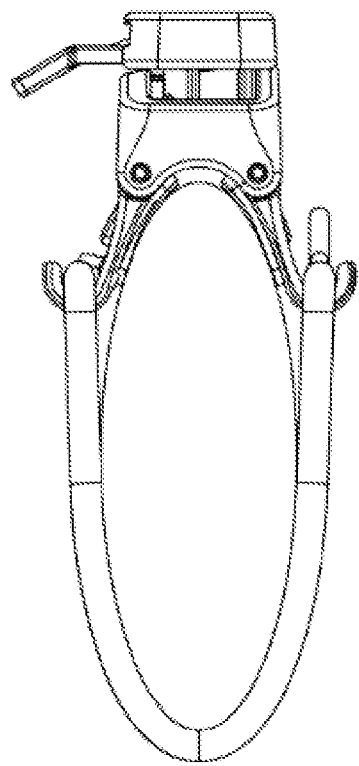
FIG. 4 is a schematic diagram that the bicycle-mounted holder of the present invention buckles an article with an elliptical cross section.
Figure 5:
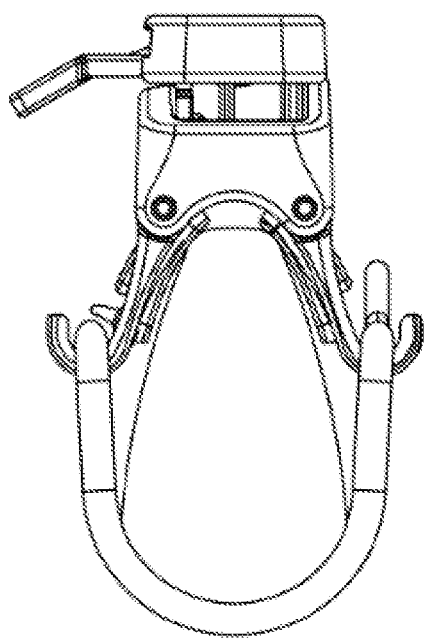
FIG. 5 is a schematic diagram that the bicycle-mounted holder of the present invention buckles other articles.

In the present invention, since the two movable arms 30 and 40 are capable of rotating around the pins 11, the two movable arms approach infinitely, and the two movable arms 30 and 40 can be also parallel to the ground respectively, so that the angle between the two movable arms 30 and 40 is changed, and therefore, the two movable arms can be used to buckle articles of different shapes and different sizes in conjunction with the telescopic buckle 70, that is to say, can be fit for pipes of different diameters and specially-shaped pipes of all commercially available bicycles. As shown in FIG. 3A, in allusion to the circular pole having a smaller diameter, for instance, being 20 mm, the two movable arms can be just tightly clung to the circular pole, and the bicycle-mounted holder can be fixed on the circular pole in conjunction with the buckle with appropriate length; however, in allusion to a circular pole having a larger diameter, for instance, being 35 mm, as shown in FIG. 3B, the two movable arms can be just tightly clung to the circular pole as well, and the bicycle-mounted holder can be fixed on the circular pole in conjunction with the buckle with appropriate length. FIG. 4 and FIG. 5 show that the two movable arms can be used to fix the bicycle-mounted holder on an article having an elliptical cross section as shown in FIG. 4 or an article having a cross section as shown in FIG. 5 as well in conjunction with the buckle with appropriate length.

Figure 6:
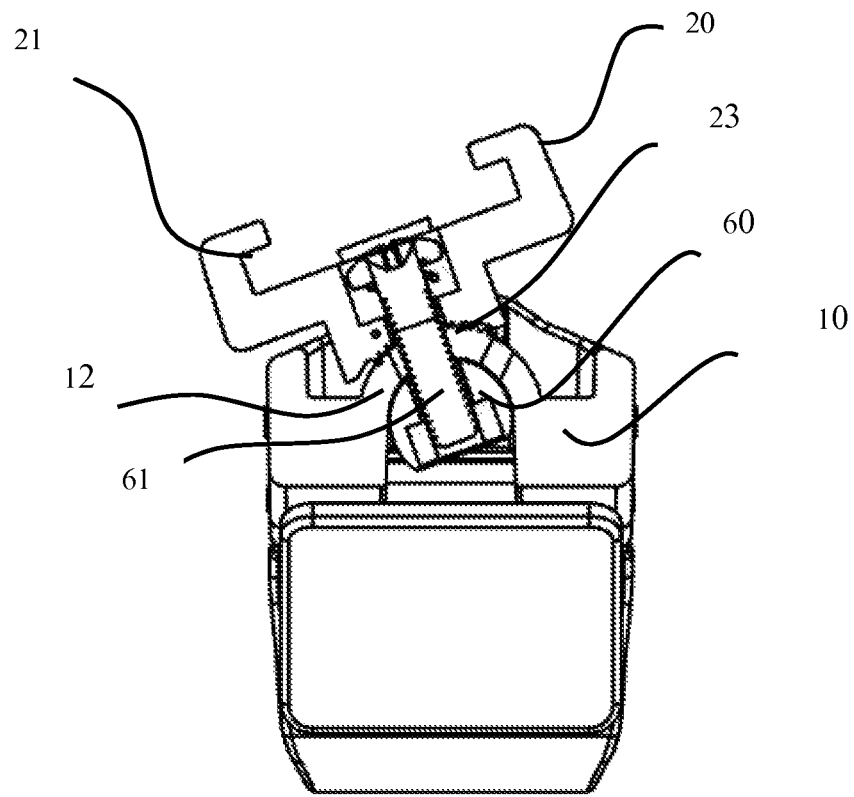
FIG. 6 is a cross-section schematic diagram of the bicycle-mounted holder of the embodiment of the present invention.

Please refer to FIG. 1 and FIG. 6 simultaneously, for the purpose of adjusting the angle of the supporting plate up and down, an arched component 12 which is arched upwards is configured in the center of the upper surface of the pedestal; the arched component 21 is provided with a through hole slot through which the screw 61 penetrates and moves; the bottom of the supporting plate is provided with an arc surface 23 which is matched with the arched component and configured to enable the supporting plate to rotate in a small range around the arched component, namely the supporting plate is adjusted to swing to different regulating angles. Furthermore, the arc surface of the bottom of the supporting plate is provided with multiple gear snaps which are configured to achieve the purpose of adjusting the supporting plate 20 in an up-down direction.

In this embodiment, a barrier block 13 is configured on both ends of the arched component 12 respectively and is integrally formed with the upper surface of the pedestal; and the bottom part of the supporting plate is equipped with an arc-surface fringe 22, and the arc surface 23 is located on the bottom of the arc-surface fringe.

Furthermore, for the purpose of well tightening the screw, the bicycle-mounted holder also comprises a positioning shaft 60 which is located below the arched component 12 and is connected with the supporting plate 20 through the screw 61, the upper surface of the positioning shaft 60 is arc-shaped and is coincident with the lower side of the arched component 12 in shape, and the lower surface thereof is smooth; and when the supporting plate 20 is rotated, the screw penetrating through the supporting plate 20 will drive the positioning shaft 60 to rotate.

After penetrating through the positioning shaft 60, the screw can be locked by a nut 63, so that the supporting plate is tightly locked on certain angle; and furthermore, the bicycle-mounted holder also comprises a spring 62 which is located on the supporting plate 20, and at this moment, the screw 61 needs to penetrate through the spring 62, the supporting plate 20 and the pedestal 10 in sequence, and when the positioning shaft 60 exists, the screw 61 needs to penetrate through the positioning shaft 60 finally and is then locked by the nut 63.

A gasket 63 and the spring 62 are also configured above a nut 64, wherein the spring 62 plays an elastic buffer role in the process of adjusting the angle of the supporting plate 20.

Figure 7:
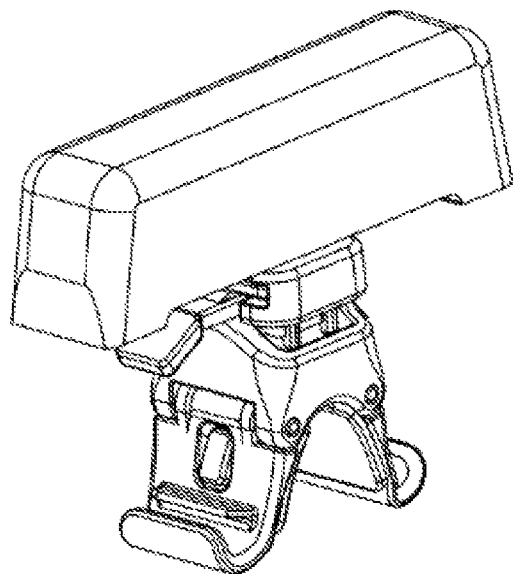
FIG. 7 is a schematic drawing for use of the supporting plate of the bicycle-mounted holder of Embodiment 1 of the present invention.
Figure 8:
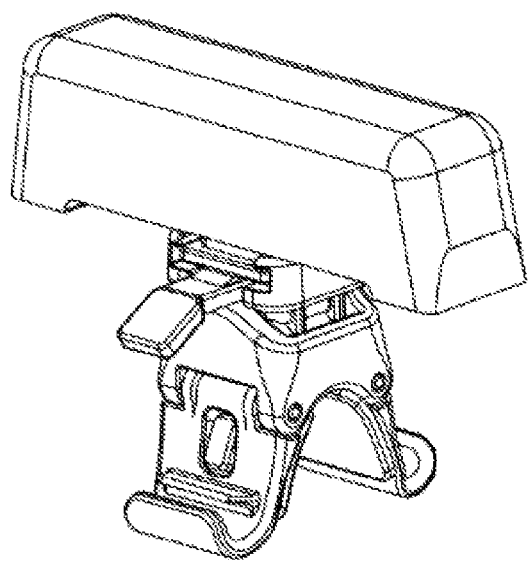
FIG. 8 is a schematic drawing for use of the supporting plate of the bicycle-mounted holder of Embodiment 2 of the present invention.

Please refer to FIG. 1, FIG. 7 and FIG. 8 simultaneously, the supporting plate 20 is provided with two guide rail grooves 21 which are parallel to each other, and the opening of each guide rail groove 21 is configured along the horizontal direction; the tail ends of the two guide rail grooves 21 are connected together by means of a baffle plate for the purpose of preventing articles from slipping off. The length of each guide rail groove 21 is equal to the distance between the two guide rail grooves 21, and therefore, the article can be vertically fixed on the supporting plate 20 as shown in FIG. 7, and can be also transversely fixed on the supporting plate 20 as shown in FIG. 8. Moreover, the two movable arms can be configured to fix a bicycle lamp, so that the bicycle lamp can be used in a distance not more than 15 mm away from the stem.

According to the bicycle-mounted holder provided by the prevent invention, the angle between the two movable arms is changed by enabling the movable arms to flexibly rotate around the respective pins fixed on the pedestal, and the bicycle-mounted holder can be fixed on pipes of different diameters and specially-shaped pipes of all commercially available bicycles; the anti-skidding pads are additionally configured on the inner sides of the two movable arms to prevent the bicycle-mounted holder from falling off, and the barrier sheet is configured on the outer side of the corresponding movable arm and is matched with the arc surface of the corresponding movable arm for the purpose of preventing the buckle from falling off; and the angle of the supporting plate is adjusted by means of the designs of the arc surface on the bottom of the supporting plate and the gear snaps.

The preferred embodiments of the present invention are illustrated as above by reference to the attached drawings, and multiple transformation solutions, made by those skilled in the art, without departing from the scope and the essence of the present invention, are available for realizing the present invention. For instance, partially indicated or described features of one embodiment can be available for the other embodiment so as to obtain another embodiment. Those stated as above are just preferred feasible embodiments of the present invention and are thus incapable of limiting the patent scope of the present invention, and equivalent transformations made by use of contents of the description and the attached drawings of the present invention should fall within the patent protection scope of the present invention in the same way.

What is claimed is:

1. A bicycle-mounted holder, wherein the bicycle-mounted holder comprising:
    a pedestal, the bottom of which is equipped with two pins that are parallel to each other;
    a supporting plate which is fixed on said pedestal through a screw;
    two movable arms which are located on said two pins respectively and are capable of rotating around said respective pins; the tail end of each of said two movable arms is provided with an arc surface which is curled outwards; each of said two movable arms is provided with an inward arc surface which is matched with the bottom of said supporting plate, and said inward arc surface is capable of being stretched outwards and contracted for clamping fit with an non-cylindrical and olivary article of different shape and different size; and
    a buckle which is configured to be simultaneously buckled on the arc surfaces of said two movable arms.

2. The bicycle-mounted holder according to claim 1, wherein said supporting plate is provided with two guide rail grooves which are parallel to each other.

3. The bicycle-mounted holder according to claim 2, wherein an opening of each guide rail groove is configured along the horizontal direction.

4. The bicycle-mounted holder according to claim 2, wherein the length of each guide rail groove is equal to the distance between said two guide rail grooves.

5. The bicycle-mounted holder according to claim 1, wherein the outside surface of one of said two movable arms is equipped with a barrier sheet, said barrier sheet is on the same level with the tail end of the arc surface of said movable arm and is configured to prevent said buckle from falling off in cooperation with said arc surface.

6. The bicycle-mounted holder according to claim 5, wherein the distance between said barrier sheet and the tail end of the arc surface of said movable arm is less than the diameter of said buckle.

7. The bicycle-mounted holder according to claim 1, wherein it also comprises anti-skidding pads which are connected with the inward arc surfaces of said movable arms.

8. The bicycle-mounted holder according to claim 7, wherein each anti-skidding pad is provided with a raised ridge, each movable arm is provided with a fixing hole, and said anti-skidding pad and the inner side of said movable arm are connected through inserting said raised ridge on said anti-skidding pad to said fixing hole.

9. The bicycle-mounted holder according to claim 1, wherein an arched component which is arched upwards is configured in the center of the upper surface of said pedestal; and the bottom of said supporting plate is provided with an arc surface which is matched with said arched component and is configured to enable said supporting plate to swing to different regulating angles around said arched component.

10. The bicycle-mounted holder according to claim 9, wherein the arc surface of the bottom of said supporting plate is provided with a plurality of gear snaps which are configured to realize the regulation of said supporting plate in an up-down direction.

11. The bicycle-mounted holder according to claim 9, wherein a barrier block is configured on both ends of said arched component respectively and integrally formed with the upper surface of said pedestal; and the bottom of said supporting plate is provided with an arc-surface fringe, and said arc surface is located on the bottom of said arc-surface fringe.

12. The bicycle-mounted holder according to claim 9, wherein it also comprises a positioning shaft located below said arched component and connected with said supporting frame through said screw.

13. The bicycle-mounted holder according to claim 1, wherein it also comprises a spring which is located on said supporting plate, and said screw penetrates through said spring, said supporting plate and said pedestal in sequence.

14. The bicycle-mounted holder according to claim 1, wherein said two movable arms can be configured to fix a bicycle lamp, so that the bicycle lamp is used in a distance not more than 15 mm away from a stem.

\* \* \* \* \*